United States Patent [19]

Lautenschläger

[11] Patent Number: 5,090,820
[45] Date of Patent: Feb. 25, 1992

[54] WHEEL FOR ROLLING DRAWER GUIDES

[75] Inventor: Horst Lautenschläger, Reinheim, Fed. Rep. of Germany

[73] Assignee: Karl Lautenschläger GmbH & Co. KG, Reinheim, Fed. Rep. of Germany

[21] Appl. No.: 551,620

[22] Filed: Jul. 11, 1990

[30] Foreign Application Priority Data

Jul. 11, 1989 [DE] Fed. Rep. of Germany ....... 3922716

[51] Int. Cl.⁵ .............................................. F16C 29/04
[52] U.S. Cl. ........................................ 384/19; 384/58; 384/220
[58] Field of Search ................... 384/19, 58, 416, 222, 384/220; 312/350

[56] References Cited

U.S. PATENT DOCUMENTS 2,282,589  5/1942  Mayne ................... 384/416
2,912,288  11/1959  Griswold ................ 384/58
4,139,246  2/1979  Mikoshiba et al. ........ 384/222

Primary Examiner—Lenard A. Footland

[57] ABSTRACT

A wheel for guides for drawers and the like, having a wheel body journaled on an axle and made of a material of stable shape, in which at least one recess is provided, in which there is disposed a material, preferably an elastomeric plastic, that is softer in comparison to the wheel body and permits elastic deformation. The wheel body of stable shape has a hub (16) mounted on the wheel axle and a separate rim (18) surrounding the hub part concentrically and at a radial distance, the recess being formed by a circumferential interstice defined on the one hand by the radially outer circumferential surface of the hub (16) and on the other hand by the radially inner circumferential surface of the rim (18). The hub (16) and the rim (18) are held concentric with one another by an interlay (38) of the softer, resiliently deformable material disposed in the interstice.

18 Claims, 2 Drawing Sheets

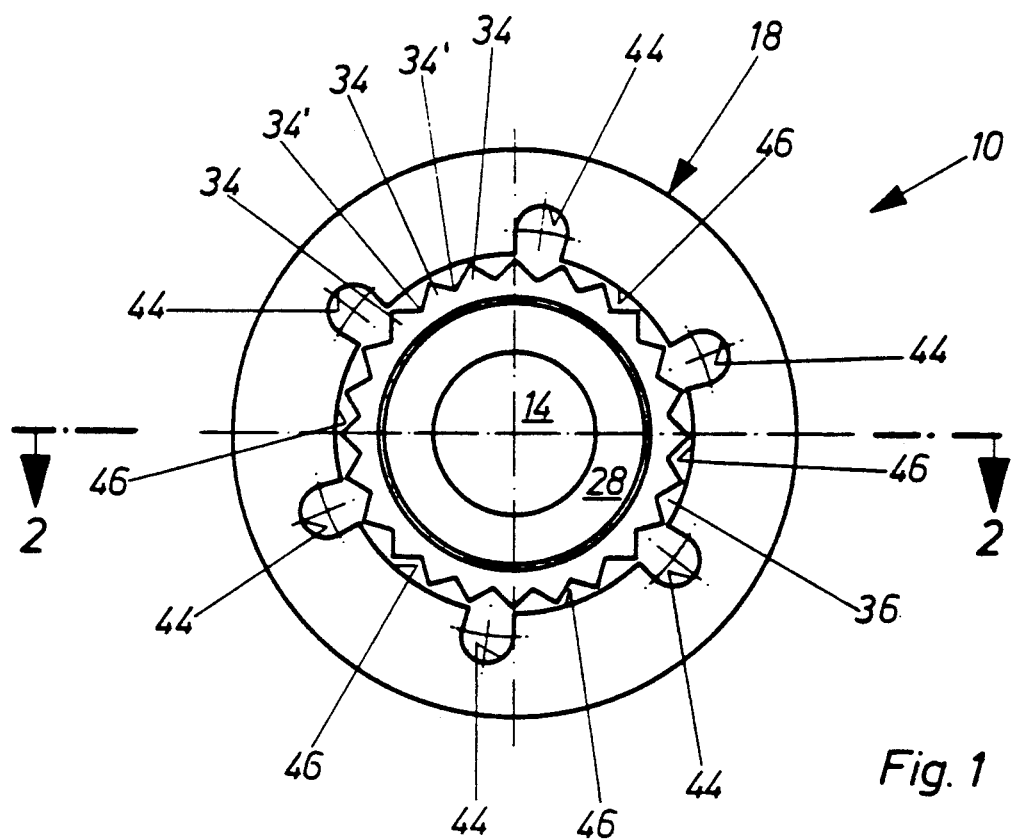
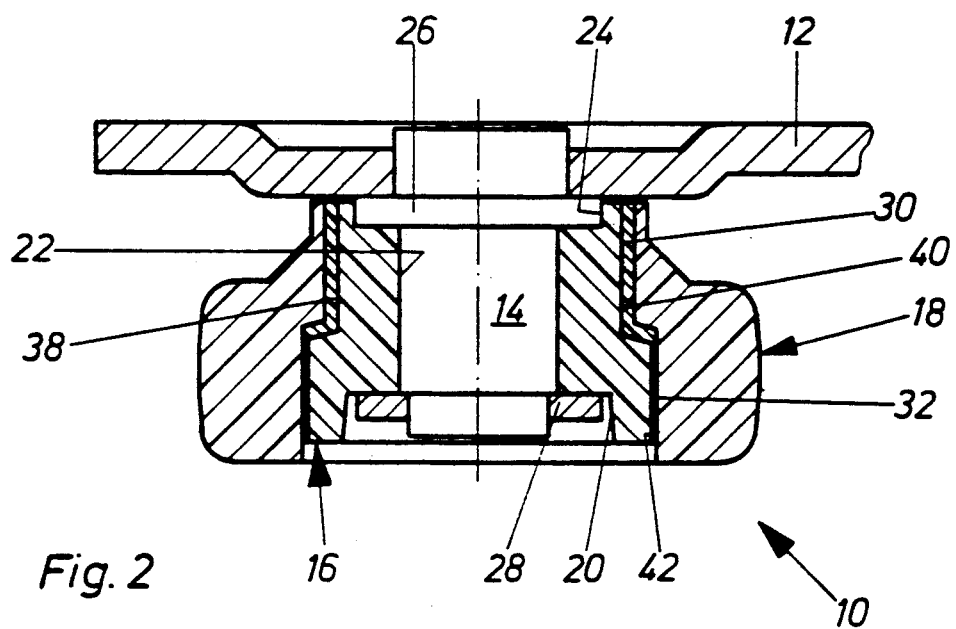

WHEEL FOR ROLLING DRAWER GUIDES

BACKGROUND OF THE INVENTION

The invention relates to a wheel for drawer guides and the like, having a wheel body journaled on a shaft and made from a material of stable shape, in which at least one recess is provided in which a material that is softer than the wheel and permits resilient deformation, preferably an elastomeric plastic, is disposed.

Known wheels configured in this manner (GB Pat. 1,008,522) are intended to reduce the rolling noise that is heard when they move along the corresponding runner or guide rail, the elastic material being in the form of a tire protruding above the actual tread of the stable-shape wheel, which largely prevents the development of the rolling noise due to its resilient properties. Since the resilient deformation of the rim, however, must not exceed a certain degree, a condition can occur when drawer guides provided with such rims are very heavily loaded, in which the rim is so greatly compressed that the actual rim of the stable-shape wheel will roll can the surface of the associated track or guide rail, and then noise will be produced which is transferred as body noise through the wheel axle to the runner or guide rail on which the wheels are held, and from there to the associated side wall of the drawer or cabinet, and can be amplified by resonant vibration of the drawer or cabinet.

The invention is addressed to the problem of designing a wheel for the rolling drawer guides in question, in which the transfer of any rolling noise that might develop to the associated cabinet parts will be prevented or at least greatly reduced, regardless of the load on the drawer guide.

THE INVENTION

Setting out from a wheel of the kind mentioned above, this problem is solved in accordance with the invention in that the stable-shape wheel body has a hub mounted on the wheel axle and a separate rim concentrically surrounding the hub at a radial distance therefrom, that the recess is formed by a circumferential interstice defined on the one hand by the radially outer circumferential surface of the hub and on the other hand by the radially inner circumferential surface of the rim, and that the hub and the rim are held concentric with one another by an interlayer of the soft, resiliently deformable material disposed in the interstice. The rim and the hub are therefore isolated by the interlayer of resiliently deformable material as regards the transfer of body sound, so that any rolling noise that may develop when the tread of the rim runs on the surface of the associated running rail or guide rail will not be transmitted to the hub and thus the development of resonant vibrations in the cabinet will be prevented. The result is a great reduction of audible running noise.

The rim is best mounted on the interlayer nonrotatably in the direction of rotation of the wheel, and latter in turn is held nonrotatably on the hub. This nonrotatable mounting can be achieved by cementing the interlayer to the rim and to the hub. Preferably, however, a number of groove-like depressions running parallel to the wheel axis are provided in the confronting circumferential surfaces of the hub and/or of the rim and the interlayer is engaged in them. In this manner an interlocking junction between the rim and/or the hub and the interlayer is achieved in the direction of rotation of the wheel.

The configuration can be such that the groove-like recesses extend only over part of the width of the hub and/or rim, while the remainder of the width of the hub or rim is free of the groove-like recesses.

The confronting circumferential surfaces of the hub and/or of the rim are then best defined in the portion of the width that is free of groove-like recesses by a circular cross section.

In that case the portion of the width that is free of groove-like recesses is preferably formed in the area of the hub and/or of the rim adjacent the runner or guide rail on which the wheel is mounted, and the mean diameter, measured in the radial direction, of the portion of the circumferential surface of the hub or rim that is free of groove-like recesses is preferably smaller than the mean diameter of the adjoining portion provided with the groove-like recesses.

In an advantageous further development of the invention, the portion of the circumferential surface of the hub that is free of groove-like recesses has a greater width measured parallel to the axis of rotation of the wheel than the associated portion of the rim, and the portion of the rim provided with groove-like recesses has a greater width measured parallel to the axis of rotation of the wheel than the associated portion of the hub.

Thus, it then becomes possible for the rim to shift transversely relative to the hub, in the direction of the axis of the wheel, by the amount of the difference between the width of the groove-free portion of the hub and that of the rim. Such a wheel, in which the rim can shift relative to the hub parallel to the axis of rotation, can compensate tolerances in the width of the drawer or the like or in the clearances inside of the cabinet carcase. The interlayer of soft, resiliently deformable material is preferably affixed to the rim, i.e., accompanies any transverse shifting of the rim relative to the hub.

A configuration is desirable in which the hub is provided with a plurality of gear-tooth-like projections of uniform pitch reaching out radially from its circumferential surface, while the groovelike recesses are formed between adjacent projections.

The rim on the other hand can be provided in its inner circumferential surface facing the hub with a number of groove-like recesses offset from one another in a uniform, but greater, angular spacing, between which the circumferential surface has sections of arcuate cross section, while the maximum outside diameter of the hub, measured over the free ends of the radial projections, is only slightly smaller than the smallest inside diameter of the rim measured across diametrically opposite sections of arcuate cross section of the inside circumferential surface. The interlayer of resilient material is therefore relatively thin in the area between the free ends of the projections of the hub and the opposite inside circumferential surface of the rim, measured in the radial direction, so that, even under the effect of heavy weight, any radial shifting of the rim relative to the hub is prevented.

Alternatively, the configuration can also be made such that the rim is provided in its inside circumferential surface facing the hub with a number of recesses spaced at equal angular intervals, between which the circumferential surface has sections having recesses of a shape complementary to the radially extending projections of the hub, while between the projections of the hub and the complementary recesses in the associated sections of the circumference of the rim a space remains in which the interlayer of resiliently deformable material is disposed.

The projections provided on the circumferential surface of the hub and the groove-like recesses formed between the projections can, in the simplest case, have a triangular cross section defined each by flanks of rectilinear cross section, so that the circumferential surface portion of the hub provided with the projections will then give the impression of being provided with saw teeth.

Alternatively the projections provided on the circumferential surface of the hub and the groove-like recesses formed between the projections can have a rounded cross section.

The hub and/or the rim can be manufactured either of metal, as was formerly common, or, as preferred today, from an appropriate plastic by injection molding, and it may be desirable to make the hub and the rim of different materials.

For example, it can be advantageous to make the rim from a plastic which is best suited for the development of minimum rolling noise when it rolls on the track of a metal runner or guide rail, while the material for the hub is selected on the basis of different criteria, such as for example good friction and wear properties between the bore formed in it and the metal axle.

BRIEF DESCRIPTION OF THE DRAWINGS

The invention is further explained in the following description of two embodiments in conjunction with the drawings, wherein FIG. 1 is a side elevation of a wheel constructed in the manner of the invention, FIG. 2 is a cross section as seen in the direction of the arrows 2—2 in FIG. 1.

DETAILED DESCRIPTION OF PREFERRED EMBODIMENTS

Figure 3:
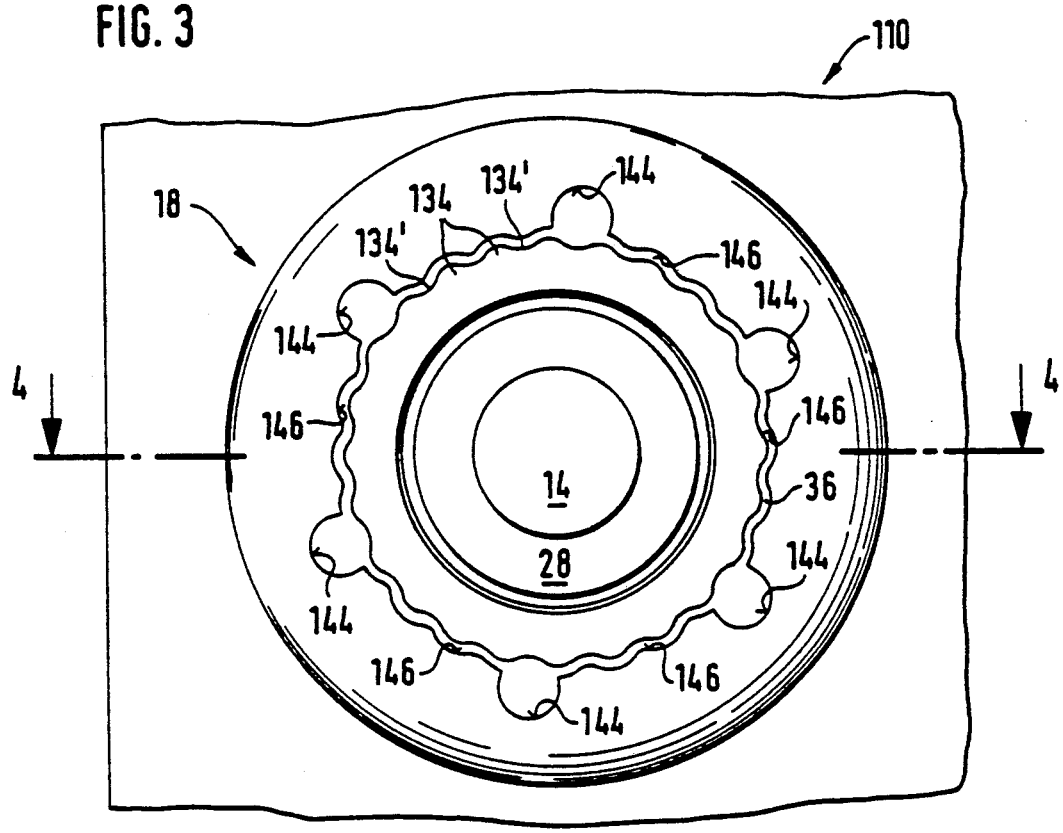
FIG. 3 is a side elevation of a variant embodiment of a wheel constructed in the manner of the invention.

The wheel shown in FIGS. 1 and 2 and identified as a whole by 10 is journaled on an axle 14 riveted to and projecting at right angles from the surface of the web 12 of the corresponding runner or guide rail. The wheel 10 itself is composed of a hub 16 serving as a bearing, and a rim 18 concentrically surrounding the hub. The hatching selected in FIG. 2 of the sectioned surfaces of the hub and of the rim indicates that the hub 16 and the rim 18 can both be made of plastic, although the plastics can have different properties— for example a relatively hard plastic with good frictional and wear properties as regards journaling on the axle 14 for the hub 16, and a softer plastic for damping noise when rolling on the track of the associated metal runner or guide rail for the rim 18. It is to be noted, however, that, for the hub 16 and the rim 18, materials as different as, for example, metal can be used on the one and plastic on the other.

A journal bore 22, provided with a counterbore 20 at its end remote from the web 12 of the corresponding rail, extends through the hub 16. At its rail end the hub is also provided with a shallow counterbore 24 in which lies a flange 26 which extends radially from the axle 14 and which on the one hand protects the axle 14 against lateral shifting in a bore in the web 12 and on the other hand protects the hub 16 against axial shifting toward the web. In the opposite counterbore 20, i.e., the one remote from the web, a disk 28 is fastened on the free end of the axle 14 and secures the hub 16 against removal from the axle 14. Adjacent to the web 12 the hub 16 has a circularly defined section 30 of shorter radius adjoined by a section 32 of greater radius, but its circumferential surface does not have a circular cross section but rather is provided on its outer circumferential surface with a plurality of radially extending projections 34 of triangular cross section running parallel to the axis of rotation of the hub, while between the projections 34 groove-like recesses 34' are formed of matching triangular cross section. All in all, therefore, the section 32 appears to be provided on its circumference with a sawtooth-like configuration.

The rim 18 surrounds the hub 16 concentrically, as previously mentioned, although between the inner boundary of the rim and the outer boundary of the hub a circumferential interstice 36 remains in which there is disposed an interlayer 38 of a resiliently deformable material that is softer than the material of the rim 18 and/or of the hub 16, e.g., an elastomeric plastic, which holds the rim 18 on the hub 16 so that the hub and the rim do not come in direct contact at any point. When the rim rolls on the track of the corresponding runner or guide rail, vibrations developing in the rim are therefore not directly transferred to the hub 16, but first to the interlayer 38 in which a great interior damping of the vibrations takes place as a result of the material properties of the interlayer. The interlayer thus isolates the rim 18 as regards the transfer of (acoustical) vibrations to the hub, so that the transmission of rolling noise from the rim 18 to the hub and from there to the axles, the corresponding runner or guide rail and finally to the carcase or door of the cabinet, is largely prevented.

The interlayer 38, which completely fills the interstice 36 between hub and rim, is co-rotational both with the hub 16 and with the rim 18, namely—on the basis of the above-described sawtooth pattern of section 32—by interlocking with the hub 16 and with the rim 18 in the manner to be described below.

The rim 18 has in its inner boundary surface opposite the portion 30 of the hub a likewise circularly defined section 40, i.e., one free of radial projections or groove-like recesses, whose diameter is greater than the section 30 of the hub 16 but smaller than the diameter of section 32 of the hub measured across the apices of the projections 34.

Opposite portion 32 of the hub 16 is a basically circularly defined portion 42 of the inner boundary surface of the rim, the diameter of this portion 42 being only slightly greater than the diameter of hub 16 measured across the apices of the projections 34. However, the inner rim boundary surface formed in section 42 is interrupted by—in the present case—six groove—like recesses concavely rounded at the bottom, which run parallel to the axis of rotation of the wheel and are distributed at equal angular intervals, and which divide the inner boundary surface of portion 42 directly opposite the projections 34 into a number of six sections 46 having an arcuate shape in side-view. The co-rotational joining of the interlayer 38 to the rim 18 is therefore assured by the fact that the interlayer 38 also engages the groove-like recesses 44 and thus an interlocking is created not only with the projections 34 and the interposed groove-like recesses 34' of the hub, but also with the recesses 44 in the rim 18.

The accordingly relatively complex shape of the interlayer 38 is obtained by injection-molding it from a plastic that has been made resilient, one part of the die for the production of the interlayer being constituted by one of the parts of the wheel—preferably the rim 18. In that case the groove-like recesses 44 open on the side of the rim remote from the web can serve simultaneously as gates for the material of the interlayer 38.

Figure 4:
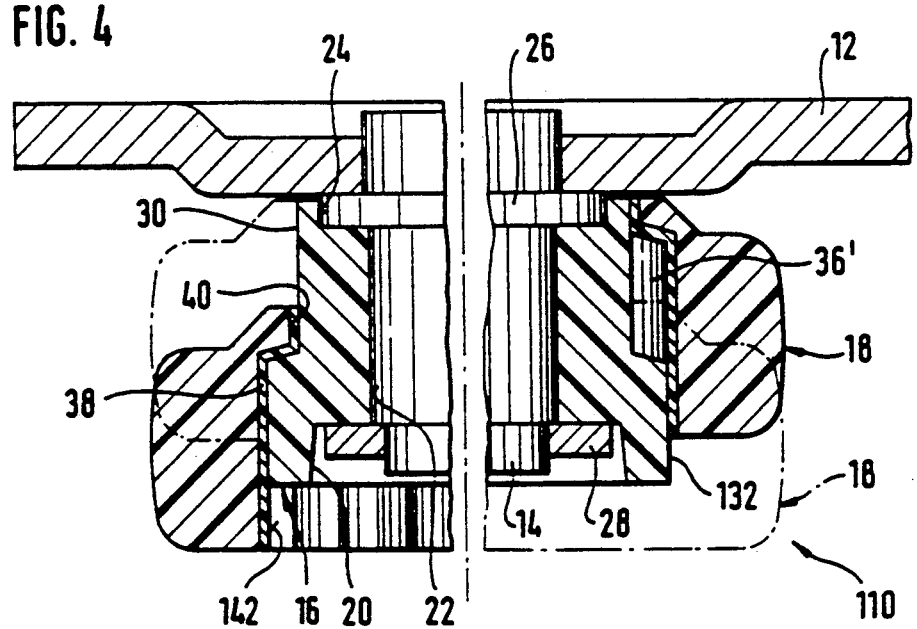
FIG. 4 is a cross section as seen in the direction of the arrows 4—4 in FIG. 3.

The wheel 110 shown in FIGS. 3 and 4 has fundamentally the same configuration as the wheel 10 in FIGS. 1 and 2 described above. Therefore, only the differences and improvements in the operation and configuration of the two wheels will be explained below, while it will suffice in regard to the identical configurations to consult the above description of FIGS. 1 and 2, since the same reference numbers are associated with identical parts of the wheels 10 and 110, and the reference numbers associated with those parts of wheel 110 that are modified but comparable in their function are prefixed by 1.

The important functional improvement of wheel 110 over wheel 10 is that the rim 18 is displaceable relative to hub 16 in the transverse direction, i.e., parallel to the axis of rotation of the wheel, within a given range. This is brought about by the fact that section 30 of hub 16, which is free of groove-like recesses, has a greater width than the corresponding portion 40 of the rim 18, and section 42 of rim 18, which is provided with groove-like recesses 44, has a greater width than the associated section 32 of the hub 16, the interlayer being affixed to the rim 18, but being displaceable relative to hub 16, yet parallel to the axis of rotation of the wheel in the required manner. The configuration is made such that the interlayer 38 does not entirely fill the interstice 36 but leaves free the interstice 36' (FIG. 4) that is necessary for the displacement of the hub relative to the rim. In FIG. 4 the two possible end positions of the shifting of rim 18 relative to the hub 16 are shown, the right half of the drawing showing the end position in which the rim 18 comes closest to the web 12 of the associated runner or guide rail, and in the left half of the drawing is shown the end position in which the rim 18 is at the greatest distance from the web 12.

In FIG. 3 it can be seen that, furthermore, the radial projections 134 and the groove-like recesses 134' formed between them are different in their cross-sectional shape from the projections 34 and recesses 34' of wheel 10, and both the apices of the projections and the bottoms of the recesses are rounded, and that the sections 146 lying between the groove-like recesses 44 of the rim 18 are not arcuate but undulating to complement the opposite projections 134 and recesses 134', but with sufficient distance therefrom to form the interstice 36 for the interlayer 38.

I claim:

1. Wheel for drawer guides, which has a wheel body made from a material of stable shape and journaled on a wheel axle, in which body at least one recess is provided, in which a material in disposed that is softer in comparison to the wheel body and permits resilient deformation, a elastomeric plastic, characterized in that the shape-staple wheel body has a hub (16) journaled on the wheel axle and a separate rim (18) surrounding the hub (16) concentrically and at a radial distance, that the recess is formed by the interstice (36) defined by the radially outer circumferential surface of the hub (16), and by the radially inner circumferential surface of the rim, and that the hub (16) and the rim (18) are held concentrically with one another by an interlayer (38) of the softer, resiliently deformable material disposed in the interstice (36) wherein the rim (18) is mounted nonrotatably on the interlayer (38) and the interlayer is mounted nonrotatably on the hub (16), and a number of groove-like recesses (34'; 44; 134'; 144) running parallel to the wheel's axis of rotation are provided in the confronting circumferential surface of the hub (16) and/or the rim (18).

2. Wheel according to claim 1, characterized in that the groove-like recesses (34'; 44; 134'; 144) extend only over a section (32; 42) of the width of the hub (16) and/or of the rim (18), while the remaining section (30; 40) of the width of its hub (16) or of the rim (18) is free of groove-like recesses.

3. Wheel according to claim 2, characterized in that the confronting circumferential surfaces of the hub (16) and/or of the rim (18) in the width section (30; 40) that is free of groove-like recesses are defined in the manner of a circular cross section.

4. Wheel according to claim 2 or 3, characterized in that the width section (30; 40) free of groove-like recesses is formed in the area of the hub (16) and/or of the rim (18) that is adjacent the corresponding runner or guide rail of the drawer guide, and that the mean diameter of the section (30; 40) free of groove-like recesses, measured in the radial direction, is smaller than the mean diameter of the section (32; 42) of the hub (16) or of the rim (18) which is provided with the groove-like recesses (34'; 44; 134'; 144).

5. Wheel according to claim 4, characterized in that the section (30) of the hub (16) that is free of groove-like recesses has a greater width measured parallel to the wheel's axis of rotation than the associated section (40) of the rim (18), and the section (42) of the rim (18) that is provided with groove-like recesses (144) has a greater width measured parallel to the axis of rotation of the wheel than the associated section (32) of the hub (16).

6. Wheel according to claim 5, characterized in that the rim (18) is displaceable relative to the hub (16) in the direction of the wheel's axis of rotation by the amount of the difference of the width of the sections (30; 40) of the hub (16) and of the rim (18) that are free of groove-like recesses.

7. Wheel according to claim 6, characterized in that the interlayer (38) is affixed to the rim (18) and is displaceable together therewith relative to the hub (16).

8. Wheel according to claim 4, characterized in that the hub (16) is provided with a plurality of projections (34; 134) projecting radially from its circumferentially surface in the manner of the teeth of a gear, the groove-like recesses (34'; 134') being formed between adjacent projections.

9. Wheel according to claim 4, characterized in that the hub (16) and the rim (18) are made from different materials.

10. Wheel according to claims 1 or 5, characterized in that the hub (16) is provided with a plurality of projections (34; 134) projecting radially from its circumferential surface in the manner of the teeth of a gear, the groove-like recesses (34'; 134') being formed between adjacent projections.

11. Wheel according to claim 10, characterized in that the rim (18) is provided in its inner circumferential surface facing the hub with a number of groove-like recesses (44) arranged offset at equal angular intervals, between which the circumferential surface has sections (46) of arcuate cross section, and that the greatest outside diameter of the hub (16), measured across the free ends of the radially extending projections (24) is only slightly smaller than the smallest inside diameter of the rim (18) measured between diametrically opposite sections (46) of arcuate cross sectional shape of the inner circumferential surface.

12. Wheel according to claim 11, characterized in that the projections (34) provided on the circumferential surface of the hub (16), and the groove-like recesses (34') formed between the projections have a triangular cross section defined in cross section by rectilinear flanks.

13. Wheel according to claim 11, characterized in that the projections (134) provided on the circumferential surface of the hub (16) and the groove-like recesses (134') formed between the projections (134) have each a rounded cross section.

14. Wheel according to claim 10, characterized in that the rim (18) is provided in its inner circumferential surface facing the hub with a number of recesses (44) disposed offset at equal angular intervals, between which the circumferential surface has sections (146) with recesses of uniform division made complementary to the radially extending projections (34) of the hub (16), a distance remaining between the projections (134) of the hub (16) and the complementary recesses in the associated circumferential surface sections (146) of the rim, in which the interlayer (38) of resiliently deformable material is disposed.

15. Wheel according to claim 10, characterized in that the projections (134) provided on the circumferential surface of the hub (16) and the groove-like recesses (134') formed between the projections (134) have each a rounded cross section.

16. Wheel according to claim 10, characterized in that the hub (16) and the rim (18) are made from different materials.

17. Wheel according to claim 1 or 5, characterized in that the hub (16) and the rim (18) are made from different materials.

18. Wheel according to claim 17, characterized in that the rim (18) is made from a plastic optimized as regards the development of the least possible running noise when rolling on the track of a metal runner or guide rail.

* * * * *